United States Patent [19]

Vogel

[11] 4,390,074
[45] Jun. 28, 1983

[54] OPERATING KEY FOR ELECTRICAL SCALES

[75] Inventor: Karl Vogel, Greifensee, Switzerland

[73] Assignee: Mettler Instruments AG, Greifensee-Zurich, Switzerland

[21] Appl. No.: 322,473

[22] Filed: Nov. 18, 1981

[30] Foreign Application Priority Data

Feb. 6, 1981 [CH] Switzerland ............................ 801/81

[51] Int. Cl.³ ........................ G01G 23/30; G01G 23/14
[52] U.S. Cl. ........................................ 177/177; 177/165
[58] Field of Search ................. 177/165, 177; 307/115

[56] References Cited

U.S. PATENT DOCUMENTS 3,727,706  4/1973  Streater et al. ................. 177/165 X
3,860,077  1/1975  Utzinger et al. ..................... 177/165
4,082,153  4/1978  Provi ................................. 177/177
4,299,299  11/1981  Knothe et al. .................. 177/165 X Primary Examiner—George H. Miller, Jr.
Attorney, Agent, or Firm—Marianne Rich

[57] ABSTRACT

The key provided for manual operations of the functioning of an electrical scale is constituted by an elongated bar which rests on two control switches. The control switches are connected to the control circuit of the scale so that activation of either one will result in the furnishing of the same control signal to the control circuit. The location of force applied to the activating member is immaterial, since no matter where the bar is touched, one or both of the switches will be depressed. This permits the operator to control the functioning of the scale without moving his eyes from the display.

10 Claims, 5 Drawing Figures

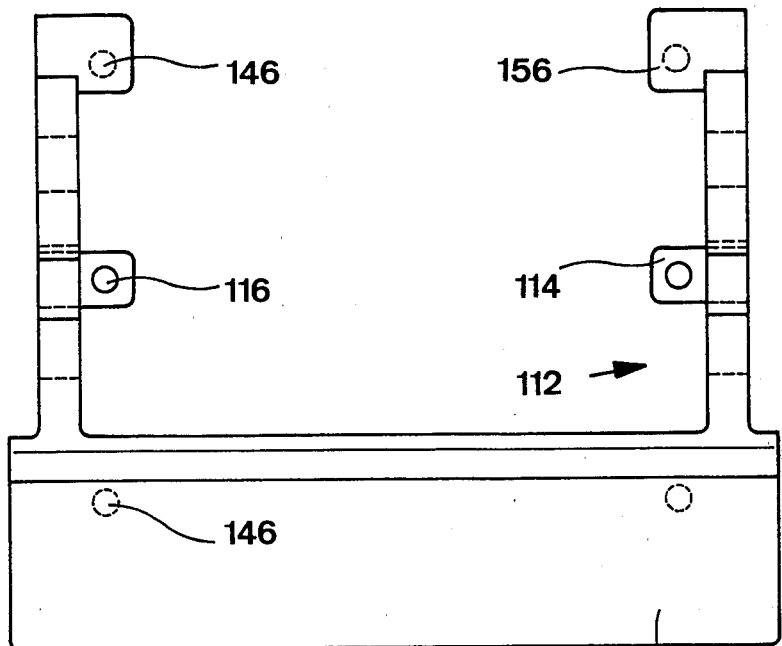
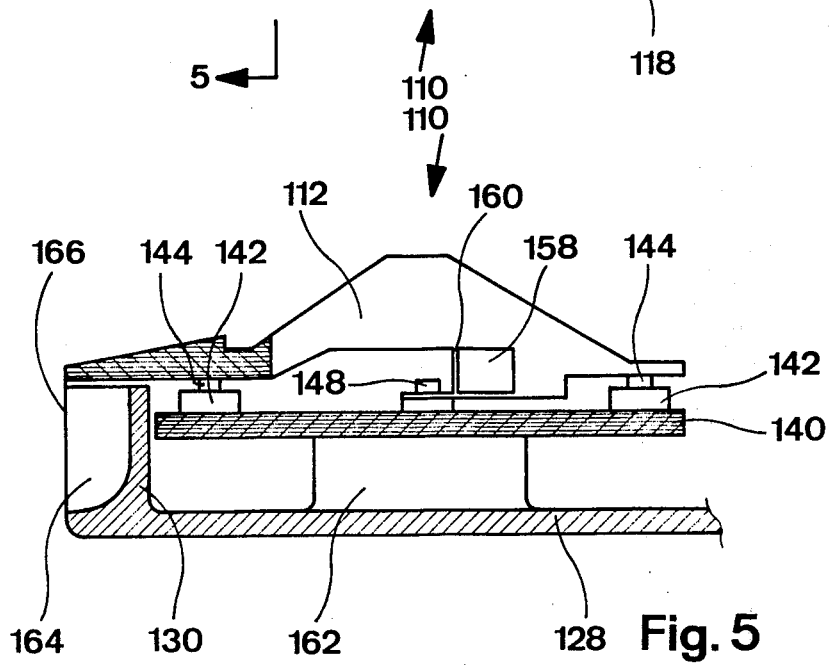

4,390,074

OPERATING KEY FOR ELECTRICAL SCALES

CROSS REFERENCE TO RELATED APPLICATIONS AND PUBLICATIONS (1) Published German Application DE-OS No. 23 39 219;

(2) U.S. Pat. No. 3,860,077, corresponding to the above-named German application.

(3) U.S. Application Ser. No.: 322,520
For: "Method and Apparatus for Selecting Operating Modes or Parameters in an Electrical Scale":
Filed: Simultaneously herewith;
Priority: Swiss Application No. 802/81-4 of Feb. 6, 1981.
Assigned to the same assignee.

All of the above are hereby incorporated by reference into the present application.

Field of the Invention

The present invention relates to electrical scales and, more particularly, to the operating key for such scales.

BACKGROUND OF THE INVENTION

In electrical scales, round or square buttons or keys or the like are generally provided to allow the operator to control the different modes of operation of the scale. In order to effect the required switching on such a scale, the operator must visually determine the location of the appropriate button or key.

A scale is also known in which the operator-controlled key projects from the housing of the scale. The key is connected to a switching element within the housing which in turn operates the main control switch. This system is described in DE-OS No. 23 39 219. The projecting key is held in its neutral position by spring tension and must be constructed in a very stable fashion since the exact movement of the key required for switching must result even when the key is operated eccentrically.

SUMMARY OF THE INVENTION

It is an object of the present invention to furnish a key suitable for operator control which is simple to construct and integrate with the main body of the scale and which, at the same time, provides simple and reliable operation requiring a minimum of visual control.

In accordance with the present invention, the operator-controlled element is an elongated key which rests on at least two functionally equivalent control switches. Thus the exact location where the key is activated makes no difference, even if the key does not cover the same path over its whole length when operated. The key can even be fairly elastic and still be operated "blind". Since the key and the control switch are directly connected, no additional component for transmitting the movement of the key to the control switch is required.

In a preferred embodiment, the key is a part of the housing of the scale and is fastened within the housing by means of a mounting. The key and the mounting may be constituted by a single plastic unit. This allows a very simple construction.

Additional simplification of the construction can be achieved if the mounting is provided with recesses constituting moving joints. The key and mounting are then a single integrated unit. Further, the relatively low spring tensions which can be chosen for the joints result in a minimum force being required for operating the key.

Preferably, the control switches are arranged on a printed circuit within a projection of the lower part of the scale, the projection being aligned with the key. This construction affords a particularly simple overload protection for the key which, when depressed, can then abut against the lower part of the scale. This construction also removes one of the disadvantages of the above-mentioned known key; it does not protrude into space, so that it is impossible to activate it unintentionally. It is also not possible to become inadvertently caught on the key.

The equipment can be made dust and spray proof by use of labyrinthic contact areas between the key and the housing of the scale as well as the base portion of the scale.

In a further preferred embodiment, the key rests on two pairs of functionally equivalent control switches. One pair is arranged in front of while the others are arranged in back of, the fastening of the key, the latter constituting a joint. This allows the key to be either lifted or depressed. If all four control switches are functionally equivalent, the operator may select whether he wishes to lift or depress the key. Alternatively, the front pair of control switches may be associated with other functions than is the rear pair. Pressing and lifting the key will then initiate different functions.

BRIEF DESCRIPTION OF THE DRAWING

FIG. 4 is a top view of a second embodiment of the key of the present invention;

FIG. 5 is a section through the key of FIG. 4 along line 5—5.

DESCRIPTION OF PREFERRED EMBODIMENTS

Figure 1:
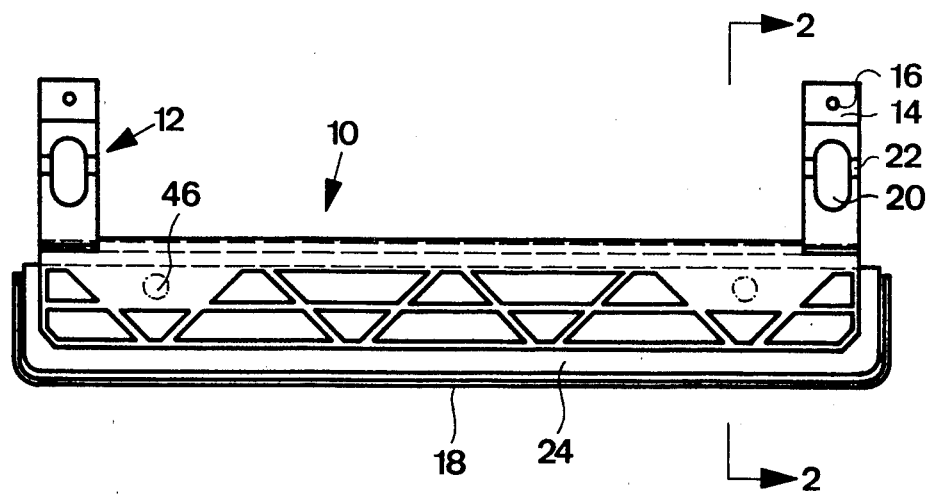
FIG. 1 is a view of the key from below.

Key 10 of FIG. 1 is a plastic injection molded part made, for example, of polyamide. It is shaped as a broad U. The two legs 12 of the U act both as mounting pieces and as guides. The section 14 at the end of each leg 12 has a hole 16 for fastening purposes. Two reduced sections are provided between sections 14 and crossbar 18 of the key. Each of the reduced section has an elongated bore 20 and two necked down portions 22. This type of construction results in a minimum required reset force.

A continuous groove 24 is provided near the three outer sides of bar 18.

Figure 2:
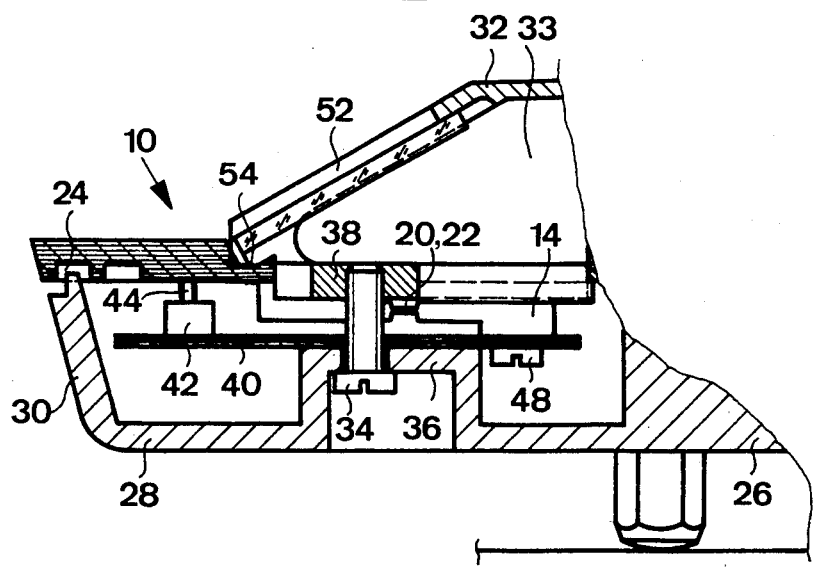
FIG. 2 is a longitudinal section of a part of a scale with built-in key, along line 2—2 of FIG. 1.

A sectional view of a built-in key 10 is shown in FIG. 2. Base 26 of the scale has a projection 28 which terminates in a wall 30 both in front and on the sides. Projection 28 is for the most part covered by cover 32 of display 33. Cover 32 is a removable part of the scale housing. Cover 32 is screwed into base 28 (see screw 34, section 36, retaining block 38).

A printed circuit 40 is also fastened onto sections 36. The printed circuit includes two control switches 42 which are arranged one behind the other relative to the plane of FIG. 2. Key 10 rests on switch pins 44, the areas of contact being indicated by dot dash circles 46 in FIG. 1. Two screws 48 fasten sections 14 of legs 12 to printed circuit 40.

Figure 3:
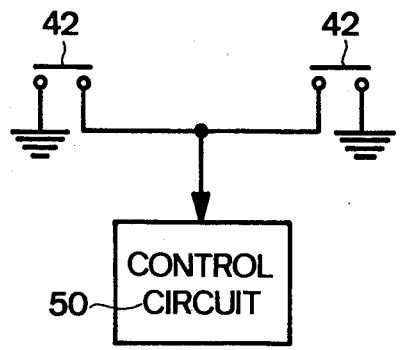
FIG. 3 is a schematic diagram illustrating the operation of the control switches.

Functional equivalency of control switches 42 is illustrated in FIG. 3. Closing of either of the two switches results in the same control pulse being applied to the electrical control circuit 50 of the scale. Control circuit 50 is illustrated only as a block, since its particular construction is not relevant to the present invention.

When at rest, key 10 is supported by the spring tension of control switches 42, so that the key rests loosely on pins 44. Groove 24, which, as mentioned above, extends along the three sides of bar 18, together with the correspondingly formed termination of wall 30 constitutes a labyrinth protection against dirt. Further dust and spray proofing is provided by groove 54 (FIG. 2) of key 10 which similarly surrounds the lower end of front plate 52 of display cover 32.

When key 10 is depressed one or both of control switches 42 may be activated, depending upon the location where the force is applied. However, the same pulse is applied to circuit 50 regardless of the location of application of force. Thus the use of two functionally equivalent control switches 42 which are arranged at relatively large distances from each other permits the correct operation of the scale even when key 10 is eccentrically operated. For example, correct operation will result even if one end of key 10 is depressed while the other remains approximately in a rest position, that is even if the key assumes a slanted position as is possible because of the resiliency of mounting 12. Additionally, the scale cannot be damaged by excessively hard depression of key 10, since the key comes to rest on wall 30 before pin 44 of switch 42 has reached its extreme position.

Many types of switches can be used as control switches 42. Microswitches are preferred. Conductive elements embedded in raised portions of rubber mats and pushed down to make contact when the key is depressed are another alternative.

Many different functions may be initiated by control switches 42. For example, in a two range scale, operation of one of switches 42 may result in a switch of the ranges. However, control switch 42 may also act as a tare switch. Many other possibilities will be readily apparent to one skilled in the art, but the functions released by the operation of control switch 42 do not constitute a part of the present invention.

The embodiment of the invention illustrated in FIGS. 1–3 allows operation of key 10 in one direction only (depression). Operation of this key cannot result in connection of this scale to the electrical outlet. A separate line switch must be provided unless the connection to the power line takes place when the line plug is inserted into the power outlet.

A second embodiment of the present invention is illustrated in FIGS. 4 and 5. A single key 110 has a substantially U shape, with two legs 112 and a crossbar 118. However, for this embodiment, legs 112 must be substantially stiffer than for the previous embodiment.

Key 110 is fastened to the scale at approximately the midpoint of legs 112. A lateral projection 114 on each leg has a hole 116 which allows fastening to a printed circuit 140 by means of screws 148. A window shaped recess 158 with an adjacent bar 160 is provided in each leg 112 near hole 116. This construction acts similarly to a universal joint, that is, either depressing or lifting key 110 at bar 118 causes bar 118 to be rotated around an axis in the proximity of the fastening points (116).

Also illustrated in FIG. 5 is projection 128 of the front part of the scale. Printed circuit 140 is fastened to two supports 162 arranged one behind the other relative to the plane of FIG. 5. Two pairs of control switches 142 with switch pins 144 are mounted on the printed circuit, one behind the other in the direction of viewing of FIG. 5. The locations where crossbar 118 rests on pins 44 are marked by broken line circles 146 in FIG. 4, as are similar locations associated with control surfaces 156 of legs 112.

Projection 128 terminates in a slightly recessed front wall 130 (to the left in FIG. 5). Sides 166 however extend as far as the ends of key 110 so that here too an overload protection is provided against excessive depression of key 110. A recess 164 is thus formed between sides 166, the recess allowing the lifting of key 110 throughout almost its complete length.

Further details of the housing of the scale, the display, etc. are not indicated in FIG. 5. They correspond substantially to the equipment shown in FIG. 2.

The above described embodiment can readily be employed for a number of applications. For example, operations of the rear control switches by lifting of the key may be used to switch the power on and off, while operation of the front control switches (pressing of the key) initiates a tare command. Another possibility is to cause the lifting of the key to shut off the scale, while pressing of the key results in the combined command of switching in of power and taring. For this combination, if the scale is already turned on only the tare command becomes effective. Other variations are readily apparent, for example, similar to those described with reference to the first embodiment. For example, a standby circuit may be used and/or depression of the key may result in the initiation of a sequence of functions, while lifting of the key causes the scale to be energized.

While the invention has been described with reference to specific embodiments, many variations will be readily apparent to one skilled in the art and are intended to be encompassed in the following claims.

I claim:

1. A device for manual operation of an electrical scale having control circuit means responsive to a control signal, comprising
    a first and second control switch arranged at a predetermined distance from each other and electrically connected to said control circuit so that activation of either of said switches furnishes said control signal to said control circuit;
    an elongated activating member mounted relative to said first and second switch so that a force applied to said activating member at any point thereof operates at least one of said switches.

2. A device as set forth in claim 1, wherein said activating member is a bar having a front, a left and a right side; and
    wherein said first and second switch are arranged near said left and right side respectively.

3. A device as set forth in claim 2, further comprising means for mounting said activating member in said scale.

4. A device as set forth in claim 3, wherein said mounting means and said bar together constitute a single plastic unit.

5. A device as set forth in claim 4, wherein said single plastic unit is substantially U shaped, said mounting means constituting a first and second leg of said U.

6. A device as set forth in claim 5, wherein said mounting means has recesses constituting joints.

7. A device as set forth in claim 1, wherein said scale has a base having a base projection terminating in a front wall;
- wherein said activating member is aligned with said base projection;
- wherein said control circuit means comprises a printed circuit board;
- wherein said first and second control switch are mounted on said printed circuit board; and
- wherein said activating member rests on said control switches.

8. A device as set forth in claim 7, wherein said activating means has a front portion having a predetermined shape and said front wall has a top portion cooperating with said front portion of said activating member to prevent entry of dust into said scale.

9. A device as set forth in claim 8, wherein said front portion of said activating member has a groove and said top portion of said front wall has an extension extending into said groove when said activating member is at rest.

10. A device as set forth in claim 1, wherein activation of said first or second control switch applies a first control signal to said control circuit means;
- further comprising a second and third control switch connected to said control circuit means so that activation of said third or fourth control switch causes application of a second control signal to said control circuit means;
- wherein said activating member is mounted relative to said control switches so that movement of that activating member in a first direction activates said first or said second control switch and movement of said activating member in a second direction different from said first direction activates said third or fourth control switch.

* * * * *